United States Patent [19]

McCloud

[11] 3,905,149
[45] Sept. 16, 1975

[54] BAIT HOLDER

[76] Inventor: Marvin H. McCloud, Rt. 1, Box 135C, Stevensville, Mont. 59870

[22] Filed: Nov. 5, 1974

[21] Appl. No.: 521,163

[52] U.S. Cl. .................................. 43/44.2; 43/44.8
[51] Int. Cl.² ................................. A01K 83/06
[58] Field of Search ............ 43/44.2, 41, 41.2, 44.8, 43/42.05, 42.36, 42.39, 44.6, 44.4

[56] References Cited
UNITED STATES PATENTS

| | | | |
|---|---|---|---|
| 531,140 | 12/1894 | Stapp.................................. | 43/44.8 |
| 2,668,387 | 2/1954 | Gallardo............................. | 43/44.4 |
| 2,836,922 | 6/1958 | Cox..................................... | 43/44.2 |
| 3,203,132 | 8/1965 | Kotis................................... | 43/42.36 |
| 3,624,950 | 12/1971 | Merckes............................. | 43/44.2 |

Primary Examiner—Warner H. Camp

[57] ABSTRACT

A lead weight is surrounded by a flat metal frame. A cylinder with an axially extending bore is attached to the frame rearwardly of and above the weight for slidably attaching the device to a fishing line. The frame extends forwardly of the weight and is shaped into a series of trapezoidal barbs placed end to end with the smaller base of a given barb being co-linear with the larger base of its forwardly extending neighbor, the forwardmost barb taking on the shape of an isoceles triangle with a base equal in length to the larger bases of the trapezoids. A downwardly and rearwardly extending fin-like member may be attached to the frame below the weight.

4 Claims, 2 Drawing Figures

PATENTED SEP 16 1975

3,905,149

BAIT HOLDER

SUMMARY OF THE INVENTION

The object of the invention is to provide a bait holder for use by fishermen which may be used to slidably attach a piece of bait such as a fish to a fishing line.

Thus, a lead weight is surrounded by a flat metal frame. The frame extends forwardly from the weight and is formed into a series of barbs placed end to end. Means attached to the frame rearwardly of and above the weight slidably attach the device to a fishing line.

In use, a piece of bait such as a fish may be impaled upon the barbs. The lead acts as a sinker, and substantially the whole device is concealed in the bait. The bait is also free to slide on and rotate about the fishing line.

DETAILED DECRIPTION OF PREFERRED EMBODIMENTS

Corresponding elements in the accompanying figures are denoted by the same number to emphasize their similarity.

Figure 1:
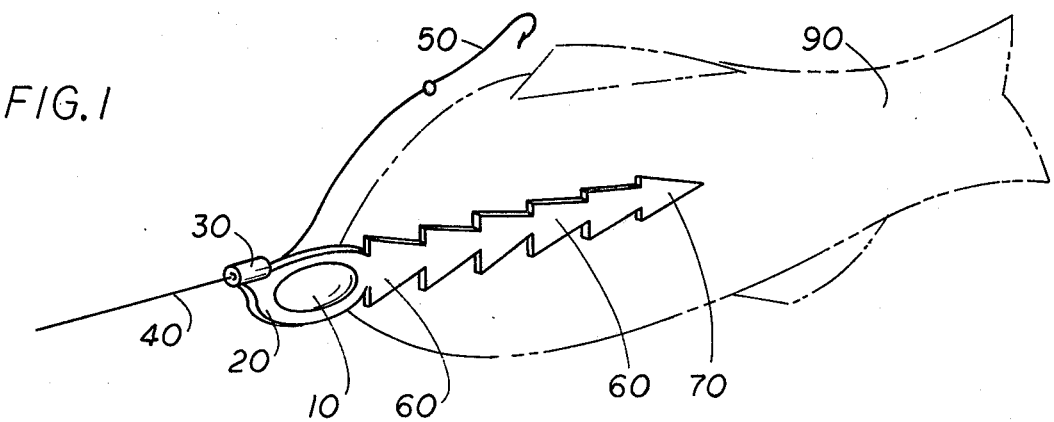
FIG. 1 shows one embodiment of the invention in use.

As shown in FIG. 1, a lead weight 10 is encircled by a flat metal frame 20. Attached to the frame above and behind the weight is a cylinder 30 with an axial bore through which a fishing line 40 is threaded, thus enabling the frame to slide along, or rotate about, the line. To the end of the line is attached at least one fishhook 50. The frame, extending forwardly of the weight, is formed into a series of congruent barbs 60 disposed end to end, the barbs generally taking the shape of trapezoids, with the smaller base of a given trapezoid being roughly co-linear with the larger base of its forwardly extending neighbor. The forwardmost barb 70 is generally shaped like an isoceles triangle with a base equal in length to the larger bases of the trapezoids.

Figure 2:
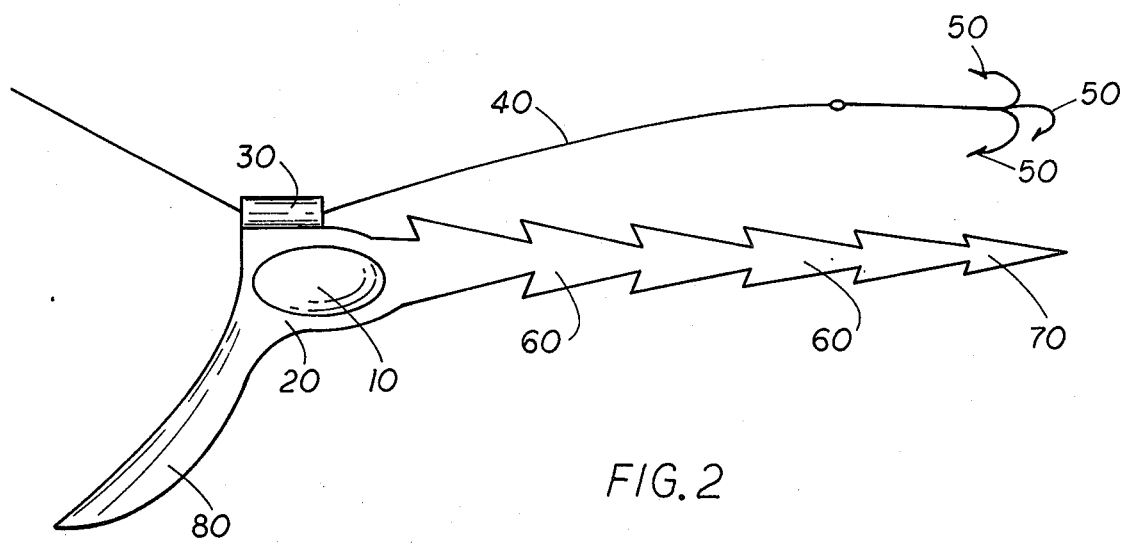
FIG. 2 shows a second embodiment of the invention in side view.

In the embodiment shown in FIG. 2, a downwardly and rearwardly extending fin-like member 80 is attached to the frame below and behind the weight. The fin causes the device to move more erratically as it moves through the water. As is shown in FIG. 1, a bait fish 90 is impaled upon the barbs to attract fish to the fishhook. Most of the device is thus hidden inside the bait fish, making its existence hard to detect.

The scope of the invention is limited only by the following claims:

What is claimed is
1. A bait holder comprising:
   a lead weight;
   a flat metal frame surrounding the weight and extending forwardly therefrom to form a series of barbs placed end to end; and
   means disposed on the frame rearwardly of and above the weight slidably attaching the frame to a fishing line.

2. The device of claim 1 wherein the means comprises a cylinder with an axially extending bore.

3. The device of claim 2 wherein the barbs form a series of congruent trapezoids with the smaller base of a given trapezoid being co-linear with the larger base of its forwardly extending neighbor, and wherein the forwardmost barb is an isoceles triangle with a base equal in length to the larger bases of the trapezoids.

4. The device of claim 3 further characterized by a downwardly and rearwardly extending fin-like member attached to the frame below the weight.

* * * * *